(No Model.)
P. LANGE.
ELECTRIC GALVANOMETER.
No. 366,409. Patented July 12, 1887.
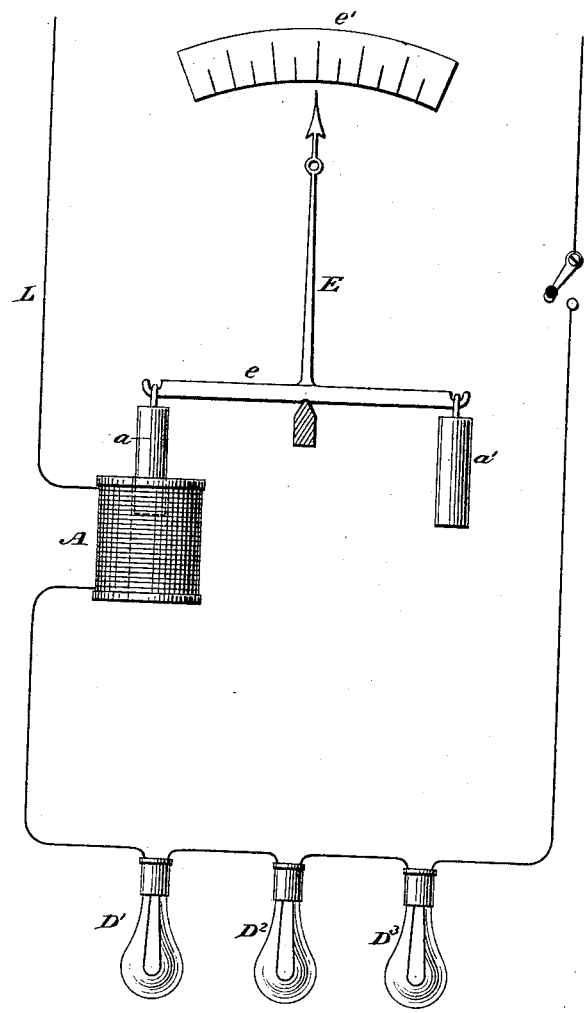
Witnesses
Geo. W. Breck
Carrie E. Ashley
By his Attorneys
Inventor
Philip Lange
Pope & Edgecomb

UNITED STATES PATENT OFFICE.

PHILIP LANGE, OF PITTSBURG, PENNSYLVANIA, ASSIGNOR TO GEORGE WESTINGHOUSE, JR., OF SAME PLACE.

ELECTRIC GALVANOMETER.

SPECIFICATION forming part of Letters Patent No. 366,409, dated July 12, 1887.

Application filed February 4, 1887. Serial No. 226,506. (No model.)

*To all whom it may concern:*

Be it known that I, PHILIP LANGE, a subject of the Emperor of Germany, residing in Pittsburg, in the county of Allegheny and State of Pennsylvania, have invented certain new and useful Improvements in Electric Galvanometers, of which the following is a specification.

The invention relates to the class of apparatus employed for measuring electric currents.

The object of the invention is to provide means for securing as great an amplitude of movement of an indicating device as possible from a given variation in the electro-motive force of the current traversing the same, and to reduce to a small fraction the error due to the change in resistance of a metallic coil.

In another application filed by me August 17, 1886, Serial No. 211,111, there is described an electric meter involving certain features of this invention. According to the invention there described, the electric current which traverses a circuit connected with a system of electrical distribution causes an indicating device to be operated by reason of variations in the electro-motive force of the currents traversing the circuit.

The design of the present invention is to augment the variations thus occasioned, or to amplify the movement of the indicating device, and to simplify the construction of the instrument; and to this end it consists in introducing one or more incandescent electric lamps in the circuit in series with the coil of the indicator. These serve to increase the effect due to any variation by reason of the change which occurs in their own resistance under the influence of an increase or decrease in the electro-motive force of a current traversing the indicator-coil. The introduction of the lamps enables me to reduce the resistance of the coil itself, and to thereby reduce the error due to the change of its resistance.

The accompanying drawing illustrates a general organization of apparatus embodying the features of the invention.

Referring to the figure, L represents a circuit traversed by currents, the variations of which it is desired to measure, and A represents the coil of the electric meter described in the application referred to. This coil is provided with a core, *a*, suspended upon a pivoted lever or beam, *e*. It is provided with a suitable counterpoise, *a'*. The beam *e* carries an indicator, E, moving over a scale, *e'*. In series with the coil A, which is of small resistance, there are inserted one or more incandescent electric lights, D′ D² D³. Whatever variation in the current occurs causes the indicator E to respond accordingly; but this variation is augmented by the presence of the lamps, for the reason that as the electro-motive force increases the resistance of the lamps decreases proportionately, and vice versa. The small resistance of the coil relative to the entire resistance of the circuit in which it is included will, it is evident, reduce to a minimum the error due to the change produced by the heating of the conductor.

It is designed that the galvanometer should be included in the circuit in the usual well-known manner.

I claim as my invention—

1. In a galvanometer, the combination, with the coil of the meter having a comparatively low resistance, of a series of incandescent electric lamps having a relatively-high resistance and connected in series therewith, and reducing the error due to the change in the resistance of the coil.

2. The combination, in a galvanometer, of the indicating device, the coil for actuating the same, and a relatively high artificial resistance connected in series therewith, reducing the error due to the change in the resistance of the coil.

In testimony whereof I have hereunto subscribed my name this 8th day of December, A. D. 1886.

PHILIP LANGE.

Witnesses:
J. G. BACKOFEN,
CHARLES A. TERRY.